United States Patent [19]

Crawford

[11] 4,346,336
[45] Aug. 24, 1982

[54] BATTERY CONTROL SYSTEM

[75] Inventor: James J. Crawford, Ringwood, N.J.

[73] Assignee: Frezzolini Electronics, Inc., Hawthorne, N.J.

[21] Appl. No.: 207,647

[22] Filed: Nov. 17, 1980

[51] Int. Cl.³ .............................................. H02J 7/10
[52] U.S. Cl. ......................................... 320/9; 320/31; 320/35; 320/39; 320/46
[58] Field of Search .................... 320/35, 36, 3, 46, 39, 320/31, 32, 9; 307/66

[56] References Cited

U.S. PATENT DOCUMENTS

| 3,708,738 | 1/1973 | Crawford et al. | 320/40 X |
| 3,775,661 | 11/1973 | Frezzolini et al. | 320/46 |
| 3,859,588 | 1/1975 | Titus | 307/66 X |
| 4,240,022 | 12/1980 | Kilinskis et al. | 320/35 X |

FOREIGN PATENT DOCUMENTS 2716862 10/1977 Fed. Rep. of Germany ........ 320/35

Primary Examiner—Robert J. Hickey
Attorney, Agent, or Firm—McAulay, Fields, Fisher, Goldstein & Nissen

[57] ABSTRACT

The system comprises first and second input terminals each adapted for connection to a source of charging power, first means for feeding power from the first input terminal to a first terminal of the rechargeable power source, second means for feeding power from the second input terminal to a second terminal of the rechargeable power source. Means are provided for sensing at least one condition of the rechargeable power source and for interrupting the first means for feeding power in response thereto. Third means are provided for feeding power from the rechargeable power source to the first input terminal. The third means includes means for bypassing at least a portion of the means for interrupting the first means for feeding power.

8 Claims, 1 Drawing Figure

U.S. Patent     Aug. 24, 1982     4,346,336
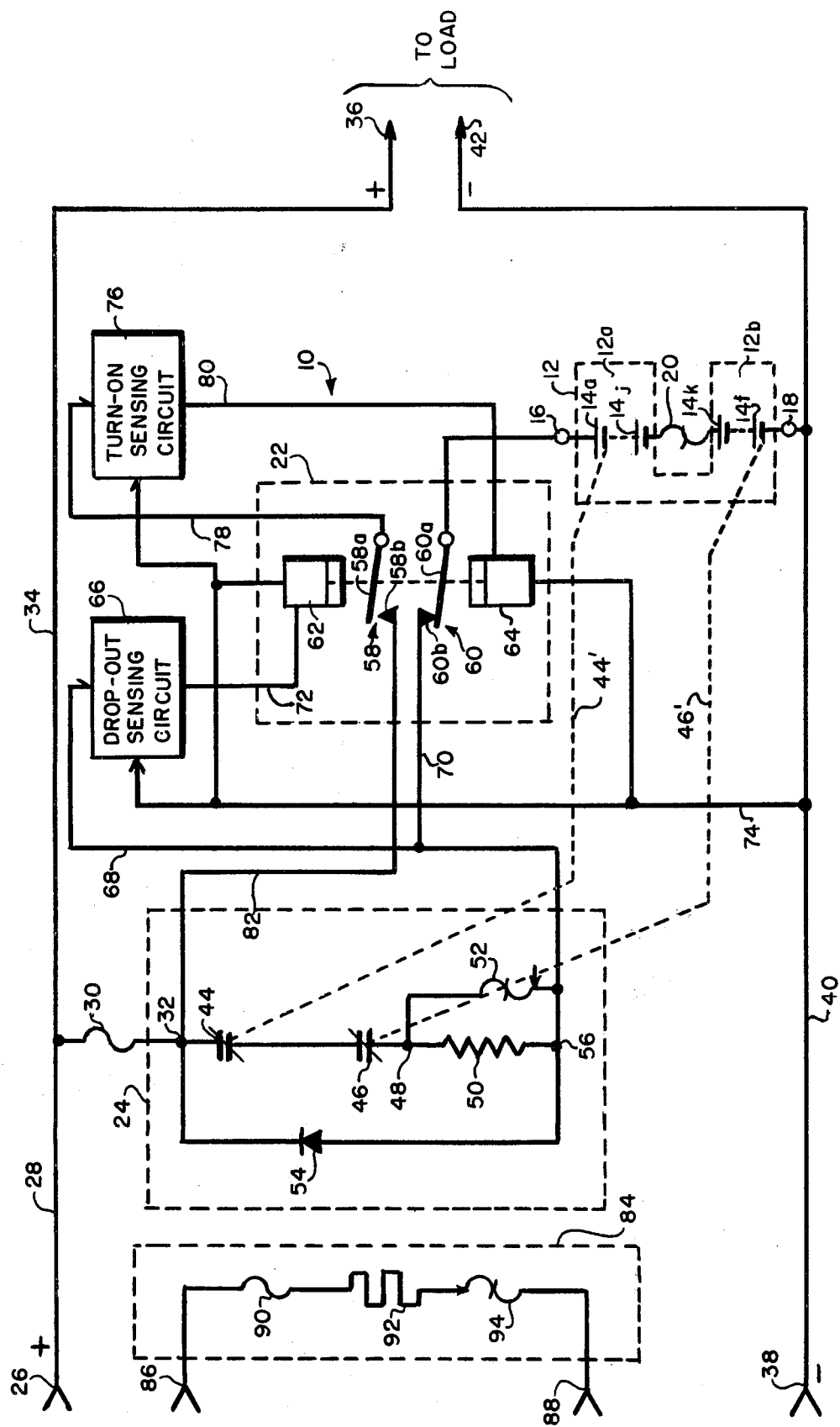

BATTERY CONTROL SYSTEM

This invention relates generally to a recharge control system for a rechargeable power source and more particularly to a recharge control system for controlling power fed to a rechargeable battery under varying conditions of charging voltage, battery charge and ambient temperatures.

Electrically powered portable devices such as flashlights, electric flashguns for cameras, razors, portable radio equipment and the like are commonly manufactured with an integral power pack or battery power source which includes both a rechargeable battery and a recharging circuit.

Rechargeable batteries such as, for example, nickel-cadmium, nickel-zinc, silver-zinc and silver-cadmium batteries exhibit a number of characteristics which must be dealt with in order to provide a dependable and safe power source. These problems include the lack of a discernable repetitive voltage characteristic which is related to the extent of charge, a gas pressure buildup during high-rate charging at low temperature and danger of battery destruction during charging or use at high temperature.

Nickel-cadmium batteries, for example, develop internal pressure from oxygen gas liberated therein when fully or overcharged. Such gas pressure has been known to explosively rupture the casing of such batteries with consequent damage to equipment and nearby personnel.

At low temperatures, below about 32° F., an excessive charging rate can produce hydrogen gas pressure which may rise to the point of rupturing the casing.

At high temperatures exceeding, for example, about 160° F., both charging and use may destroy such a rechargeable battery.

Accordingly, an object of this invention is to provide an improved recharge control system for a rechargeable power source.

A more specific object of the present invention is to provide a recharge control system for a rechargeable power source which incorporates nickel-cadmium batteries.

Another object of this invention is to provide a recharge control system for a nickel-cadmium battery which avoids overcharge, limits charging current at low temperatures, disables the battery and charging circuit at excessively high temperatures and provides a thermostatically controlled heater for maintaining the battery temperature above a predetermined low value.

Accordingly, a recharge control circuit for a rechargeable power source constructed according to the present invention comprises first and second input terminals each adapted for connection to a source of charging power, first means from feeding power from the first input terminal to a first terminal of the rechargeable power source, second means for feeding power from the second input terminal to a second terminal of the rechargeable power source. Means are provided for sensing at least one condition of the rechargeable power source and for interrupting the first means for feeding power in response thereto. Third means are provided for feeding power from the rechargeable power source to the first input terminal. The third means includes means for bypassing at least a portion of the means for interrupting the first means for feeding power.

Other features and advantages of the present invention will become apparent from a consideration of the following detailed description when taken in conjunction with the accompanying drawing, in which:

The FIGURE is a schematic and block diagram of a recharge control system for a rechargeable power source in accordance with the present invention.

A recharge control system for a rechargeable power source, shown generally at 10 in the FIGURE, controls charging power fed to a rechargeable power source such as, for example, a multi-cell battery 12 and power fed from multi-cell battery 12 to a load (not shown).

Briefly stated, recharge control system 10 permits charging current to be fed to, and load power to be withdrawn from battery 12 only as long as more than a predetermined minimum battery voltage remains in battery 12 and cuts off, or isolates, battery 12 from the load whenever the battery voltage falls below this predetermined minimum. This prevents battery damage due to excessive discharge. In addition, recharge control system 10 senses application of a charging voltage and thereupon reconnects battery 12 to the charging voltage and the load. A high temperature sensor disables battery 12 at dangerously high temperatures and a thermostatically controlled heater maintains its temperature at a level which permits full rate charge and discharge.

In greater detail, a multi-cell battery 12 may conveniently be divided into two subsets 12a and 12b of cells. For purposes of example only, and not as a limitations, multi-cell battery 12 may contain twenty cells 14a–14t separated into two sets 14a–14j and 14k–14t of ten cells each in series between a positive battery terminal 16 and a negative battery terminal 18. If each cell provides a nominal 1.5 volts, a battery terminal voltage of 30 volts is provided.

A thermostat 20, part of recharge control system 10, is connected in series with cells 14a–14t and, preferably, in series between cells 14j and 14k. Thermostat 20 is in good thermal contact with battery 12 in order to be responsive to battery rather than to ambient temperature. Thermostat 20 remains closed at temperatures below a predetermined value such as, for example, 160° F. and opens above the predetermined temperature to terminate both the charging of battery 12 and the feeding of power to the load.

Battery 12 receives charging power from, and delivers stored power through, a relay assembly 22 and a charge-discharge control circuit 24.

A positive terminal 26 for receiving charging power is connected via a line 28 and an optional fuse 30 to a junction 32 in charge-discharge control circuit 24. Line 28 is also connected to an output line 34 which feeds battery power to a positive load terminal 36. A negative terminal 38 for receiving charging power is connected via a line to negative battery terminal 18 and a negative load terminal 42. Although a separate positive charging terminal 26 and a positive load terminal 36 are shown, it would be clear to one skilled in the art that a single terminal may perform both functions. Similarly, the functions of negative charging terminal 38 and negative load terminal 42 may also be performed by a single terminal.

For purposes of description, it is assumed that the battery temperature is between 32° and 160° F., and the battery is less than fully charged but has greater than a minimum threshold terminal voltage.

Each subset of cells includes at least one cell 14a, 14t having a pressure controlled switch contact 44 and 46 in charge-discharge control circuit 24 actuated by gas pressure in the respective cells. Dashed lines 44' and 46' joining cells 14a and 14t to pressure controlled switch contacts or switch means 44 and 46 respectively represent the mechanical actuation of switch contacts 44 and 46 by pressure in the cells. Pressure controlled switch contacts 44 and 46 and their relationship to battery 12 may conveniently be of the type described in U.S. Pat. No. 3,775,661, the disclosure of which is herein incorporated by reference. Pressure controlled switch contacts 44 and 46 are connected in series between junction 32 and a junction 48. Junction 48 is connected to a first end of a resistor 50 in parallel with a thermostat 52. A power diode 54 such as, for example, a low-forward-drop Schottky power diode, has its cathode terminal connected to junction 44 and its anode terminal connected to a junction 56 at the second end of resistor 50 and thermostat 52. Power diode 54 is effective to bypass all of the remaining elements of charge-discharge control circuit 24 for power flowing from battery 12 to positive load terminal 36 but to block power flowing from positive terminal 26 toward battery 12 as will be explained hereinafter.

Relay assembly 22 contains a pair of single-pole single-throw switches 58 and 60 having movable terminals 58a and 60a ganged together for latching actuation by a drop-out solenoid 62 and a turn-on solenoid 64. Movable contacts 58a and 60a are oppositely actuated with respect to their fixed contacts 58b and 60b. That is, when movable contact 60a is in contact with its fixed contact 60b, movable contact 58a is out of contact with its fixed contact 58b and vice-versa. In the operational condition shown, closed contacts 60a and 60b provide power to and from positive battery terminal 16.

A drop-out sensing circuit 66 is connected via a line 68 and a line 70 to fixed terminal 60b of switch 60. Thus, when relay assembly 22 is in the operational condition shown, drop-out sensing circuit 66 receives the voltage at positive battery terminal 16. An output line 72 from drop-out sensing circuit 66 is connected to drop-out solenoid 62 for actuation thereof. A reference voltage is connected from line 40 via a line 74 to inputs of drop-out sensing circuit 66 and drop-out solenoid 62.

A turn-on sensing circuit 76 is connected via a line 78 to movable contact 58a of switch 58. An output line 80 is connected from turn-on sensing circuit 76 to turn-on solenoid 64. The reference voltage is connected from line 74 to inputs of turn-on sensing circuit 76 and turn-on solenoid 64. Fixed terminal 58b of switch 58 is connected by a line 82 to junction 32.

A thermostatically controlled heater circuit 84 receives heater power at input terminals 86 and 88. Terminal 86 is connected via an optional fuse 90 to a heater element 92. A thermostat 94 is connected between heater element 92 and input terminal 88.

As previously noted, the condition shown in the FIGURE is the normal configuration during which charging of battery 12 and withdrawal of charge from battery 12 may be accomplished. When battery 12 becomes fully charged, oxygen gas buildup in cell 14a or 14t actuates its respective pressure controlled switch contact 44 or 46 respectively to open the charging path from junction 32 to junction 48. Thus, charging power is cut off from positive battery terminal 16 of battery 12. After a time determined by the recombination rate of oxygen gas in the affected cell, the opened pressure controlled switch contacts 44 or 46 are again closed and charging may be resumed.

Even with one or both pressure controlled switch contacts 44 and 46 open, power may still be drawn from battery 12 to positive load terminal 36 in a bypass path from junction 56 through power diode 54 to junction 32. This bypasses all other circuits in charge-discharge control circuit 24 for delivering load power.

Thermostat 52 in charge-discharge control circuit 24 is normally closed to short, or bypass resistor 50. Thermostat 52 is opened below a predetermined temperature such as, for example, below 32° F. When the thermostat 52 is opened, resistor 50 is placed in series with the charging path to positive terminal 16 of battery 12. Thus, at low battery temperatures, the charging current to battery 12 is limited by resistor 50 to avoid excessive hydrogen pressure buildup within battery 12 and possible rupture of the casing. In the fashion previously described, power diode 54 also bypasses resistor 50 for providing power to positive load terminal 36 from battery 12. Once the temperature rises above the predetermined value, thermostat 52 again closes to short circuit, or bypass, resistor 50.

Drop-out sensing circuit 66 responds to the presence of a voltage on line 68 of less than a predetermined value such as, for example, less than 19.5 volts to produce a signal on output line 72 which, when applied to drop-out solenoid 62 actuates switches 58 and 60 from the operational condition shown in the FIGURE to their alternate conditions wherein movable contact 58a is in contact with fixed contact 58b and movable contact 60a is out of contact with fixed contact 60b.

Drop-out sensing circuit 66 may include any convenient apparatus available in the art such as, for example, a threshold sensing circuit which actuates a one-shot (not shown) for producing a single output pulse of fixed duration on output line 72 when the voltage on line 68 becomes less than 19.5 volts. Thus, when the terminal voltage of battery 12 drops below 19.5 volts, this voltage fed through switch 60, and on lines 70 and 68 to drop-out sensing circuit 66, performs the switching previously described. Thus, when the terminal voltage of battery 12 drops below a predetermined value, the opened terminals of switch 60 cut off battery 12 from further drain and prevent damage to battery 12.

When a dropout is sensed and switches 58 and 60 are moved to their alternate conditions, the voltage at positive terminal 26 is applied along line 28, through fuse 30, along line 82, through switch 58 and along line 78 to turn-on sensing circuit 76. Turn-on sensing circuit 76 thus is connected to sense the presence of sufficient voltage at positive terminal 26 to require reconnecting battery 12 to positive terminal 26. Turn-on sensing circuit 76, when it senses a sufficient voltage such as, for example, 27.5 volts, produces a signal on output line 80 which, when applied to turn-on solenoid 64 actuates movable contacts 58a and 60a of switches 58 and 60 respectively to return them to the positions shown in the FIGURE.

Turn-on sensing circuit 76 may contain any conventional apparatus but preferably includes a threshold sensing device which is sensitive to a voltage of 27.5 volts to trigger a monostable multivibrator (not shown) which produces a single, constant-width, pulse which actuates turn-on solenoid 64.

Instead of employing a pair of solenoids 62 and 64 for actuating switches 58 and 60, it would be clear to one skilled in the art that latching or sustaining relays, stepping motors or other actuating devices may be substituted without departing from the spirit of the present invention. The use of solenoids 62 and 64 avoids the need for sustain-current for solenoids 62 and 64. This is important in portable equipment where power must be supplied from a battery. In addition, for low power consumption, drop-out sensing circuit 66 and turn-on sensing circuit 76 are preferably low-drain integrated circuits.

In order to avoid battery damage at high temperature above, for example, 160° F., thermostat 20 is provided between subsets 12a and 12 in intimate thermal contact with battery 12. Above the predetermined temperature, thermostat 20 opens and disables battery 12 to prevent both receiving charge and providing power to a load. When the temperature decreases to below the predetermined value, thermostat 20 closes its contacts to again permit charging and load current to resume.

Heater circuit 84 is provided for maintaining the temperature of battery 12 in a nominal range near about 45° F. A heater element 92 is preferably a blanket-type heater element which is wrapped about battery 12. Thermostat 94 is in intimate thermal contact with cells 14a–14t in battery 12 and closes at a battery temperature below about 45° F. and opens thereabove.

It should be noted that, since heater circuit 84 normally maintains battery 12 above 32° F., thermostat 52 in charge-discharge control circuit 24 should normally remain closed to thus bypass resistor 50. Thus, full-rate charging should be available at all times except for an initial startup when the equipment is cold soaked until heater circuit 84 can raise the battery temperature above about 32° F.

The power applied to input terminals 86 and 88 of heater circuit 84 may be from the same source as the power applied to charging input terminals 26 and 38. Alternatively, the power applied to input terminals 86 and 88 may be of a different voltage or have other characteristics not shared with the charging power applied to input terminals 26 and 38.

Having described a specific preferred embodiment of the invention with reference to the accompanying drawing, it is to be understood that the invention is not limited to this precise embodiment and that various changes and modifications may be effected therein by one skilled in the art without departing from the scope or spirit of the invention as defined in the appended claims.

What is claimed is:

1. A recharge control system for a rechargeable power source comprising first and second input terminals each adapted for connection to a source of charging power, first circuit means for feeding power from said first input terminal to a first terminal of the rechargeable power source, second circuit means for feeding power from said second input terminal to a second terminal of the rechargeable power source, switch means for sending at least one condition of said rechargeable power source and for interrupting said first circuit means for feeding power in response thereto, third circuit means for feeding power from said rechargeable power source to said first input terminal, said third means including means for bypassing at least a portion of said switch means for interrupting said first circuit means for feeding power; said switch means including a pressure switch connected with said rechargeable power source and having contacts in series with said first circuit means, said switch means being responsive to said pressure exceeding a predetermined value to open said contacts; said means for bypassing including a power diode bypassing said switch contacts for power fed from said rechargeable power source to at least one of said input terminals; and a thermostat having contacts in series with said first circuit means for feeding power, said thermostat being operative to close said contacts above a predetermined temperature and to open said contacts below said predetermined temperature, and a resistor in parallel with said thermostat contacts, whereby said resistor is placed in series with said first circuit means for feeding power below said predetermined temperature, and said means for bypassing is effective for bypassing said thermostat contacts and said resistor for feeding power from said rechargeable power source to said first input terminal.

2. A recharge control system according to claim 1, wherein said rechargeable power source is adapted to comprise a plurality of interconnected cells, and a thermostat having contacts in series with pre-selected ones of said cells, said thermostat being operative to close said contacts below a predetermined temperature and to open said contacts above said temperature, said means for bypassing being ineffective to bypass said contacts whereby said rechargeable power source is rendered inoperative above said predetermined temperature.

3. A recharge control system according to claim 1 further including a second thermostat having third contacts in series with said first circuit means for feeding power, said second thermostat being operative to open said contacts above a predetermined temperature and said means for bypassing being ineffective for bypassing said third contacts.

4. A recharge control system according to claim 1 further comprising third and fourth input terminals each adapted for connection to a source of heater power and a thermostatically controlled heater connected to said third and fourth input terminals, said thermostatically controlled heater being effective to maintain the temperature of said rechargeable power source above said predetermined temperature.

5. A recharge control system according to claim 1, and drop-out sensing circuit and a switching device in series with said first circuit means for feeding power, said drop-out sensing means being responsive to a terminal voltage below a predetermined value to open said switching device, and means for sensing a voltage at said second and first input terminals exceeding a second predetermined voltage level and responsive thereto to close said switching device.

6. A recharge control system for a rechargeable battery having first and second battery terminals comprising first and second input terminals for feeding charging power to, and receiving stored power from said battery, at least one pressure responsive switch having first contacts in series with said charging power to said first battery terminal, a resistor in series with said first contact, a thermostat having second contacts in parallel with said resistor, said thermostat being effective to close said second contacts above a predetermined battery temperature, a power diode in parallel with the series combination of said first and second contacts, said diode being poled to block charging power from flowing through it but to permit stored power to flow through it, drop-out means in series with said power diode responsive to a battery terminal voltage below a first predetermined value to cut off said first battery terminal from said power diode and turn-on sensing means responsive to a voltage at said first and second input terminals exceeding a second predetermined voltage greater than said first predetermined voltage for reconnecting said first battery terminal to said power diode.

7. A recharge control system according to claim 6 further comprising means for disabling said battery at temperatures above a second predetermined battery temperature.

8. A recharge control system according to claim 6 further comprising a thermostatically controlled heater operative to maintain the temperature of said battery above said predetermined battery temperature.

* * * * *